(12) United States Patent
Lauer et al.

(10) Patent No.: US 9,314,953 B2
(45) Date of Patent: Apr. 19, 2016

(54) MULTI-COMPONENT SYNTHETIC CLOSURE AND METHOD OF MANUFACTURE

(75) Inventors: Edouard Lauer, Zebulon, NC (US); Marco Josef Otto Kirch, Cary, NC (US)

(73) Assignee: NOMACORC, LLC, Zebulon, NC (US)

( * ) Notice: Subject to any disclaimer, the term of this patent is extended or adjusted under 35 U.S.C. 154(b) by 693 days.

(21) Appl. No.: 12/291,880

(22) Filed: Nov. 14, 2008

(65) Prior Publication Data

US 2009/0130350 A1    May 21, 2009

Related U.S. Application Data

(60) Provisional application No. 61/003,419, filed on Nov. 16, 2007.

(51) Int. Cl.

| | |
|---|---|
| *B29C 47/06* | (2006.01) |
| *B65D 39/00* | (2006.01) |
| *B29C 47/00* | (2006.01) |
| *B29C 47/02* | (2006.01) |
| *B29C 47/12* | (2006.01) |
| *B29D 99/00* | (2010.01) |
| *B29L 31/56* | (2006.01) |

(52) U.S. Cl.
CPC ......... *B29C 47/0069* (2013.01); *B29C 47/0066* (2013.01); *B29C 47/025* (2013.01); *B29C 47/128* (2013.01); *B29D 99/0096* (2013.01); *B65D 39/0058* (2013.01); *B29C 47/0016* (2013.01); *B29C 2793/0027* (2013.01); *B29C 2795/007* (2013.01); *B29L 2031/565* (2013.01); *B65D 2203/00* (2013.01); *Y10T 428/13* (2015.01)

(58) Field of Classification Search
USPC ............... 264/132, 148, 448, 173.12, 173.16, 264/173.18, 45.9, 135, 171.1, 171.13
See application file for complete search history.

(56) References Cited

U.S. PATENT DOCUMENTS

| | | | | |
|---|---|---|---|---|
| 3,440,129 | A * | 4/1969 | Anselm | 428/376 |
| 6,221,450 | B1 * | 4/2001 | Noel et al. | 428/36.5 |

(Continued)

FOREIGN PATENT DOCUMENTS

| | | |
|---|---|---|
| DE | 2500534 A1 | 7/1976 |
| WO | 03018304 A1 | 3/2003 |
| WO | 2006130923 A1 | 12/2006 |

OTHER PUBLICATIONS

Notification of Reexamination for Chinese Patent Application No. 200880116171.3, mailed Feb. 12, 2014, 4 pages.

*Primary Examiner* — Atul P. Khare

(74) *Attorney, Agent, or Firm* — Withrow & Terranova, P.L.L.C.

(57) ABSTRACT

In the present invention, a manufacturing process is provided in which a complete multi-component synthetic closure is achieved which incorporates printed indicia formed thereon, in a continuous, in-line manufacturing operation. In the preferred embodiment of the present invention, the core member of the synthetic closure is formed by a continuous extrusion process which enables the core to be manufactured as an elongated, continuous length of material. As the continuous elongated length of extruded material forming the central core is advanced from the extruder towards an outer skin forming station, the central core passes through a printing station for forming any desired indicia on the outer surface of the central core prior to the application of the outer skin layer.

23 Claims, 4 Drawing Sheets

(56) References Cited

U.S. PATENT DOCUMENTS

| | | | |
|---|---|---|---|
| 6,221,451 B1* | 4/2001 | Lauer et al. | 428/36.5 |
| 6,537,405 B1* | 3/2003 | Henderson et al. | 156/195 |
| 6,907,822 B2* | 6/2005 | Coningsby | 101/40.1 |
| 2002/0180083 A1 | 12/2002 | Yaniger | |
| 2003/0102283 A1 | 6/2003 | Fox | |
| 2003/0207108 A1* | 11/2003 | Lauer | 428/376 |
| 2006/0222831 A1* | 10/2006 | Sloan | 428/195.1 |
| 2007/0026749 A1* | 2/2007 | Cheung | 441/65 |

\* cited by examiner

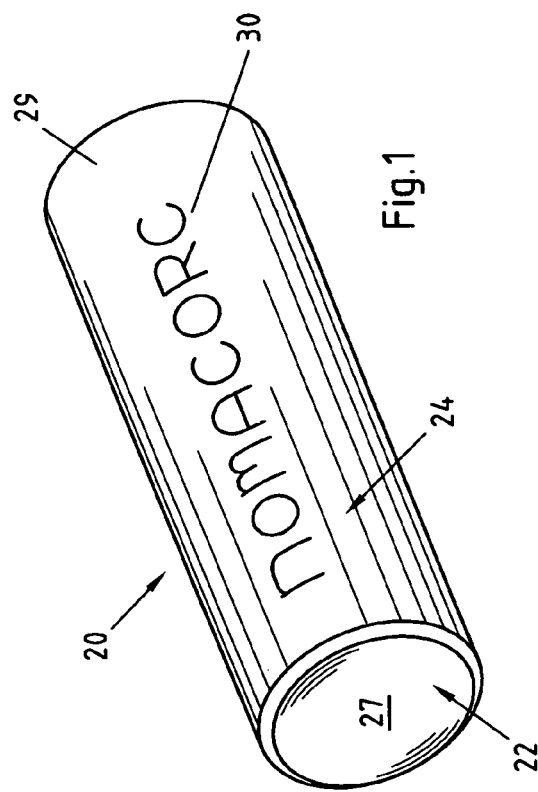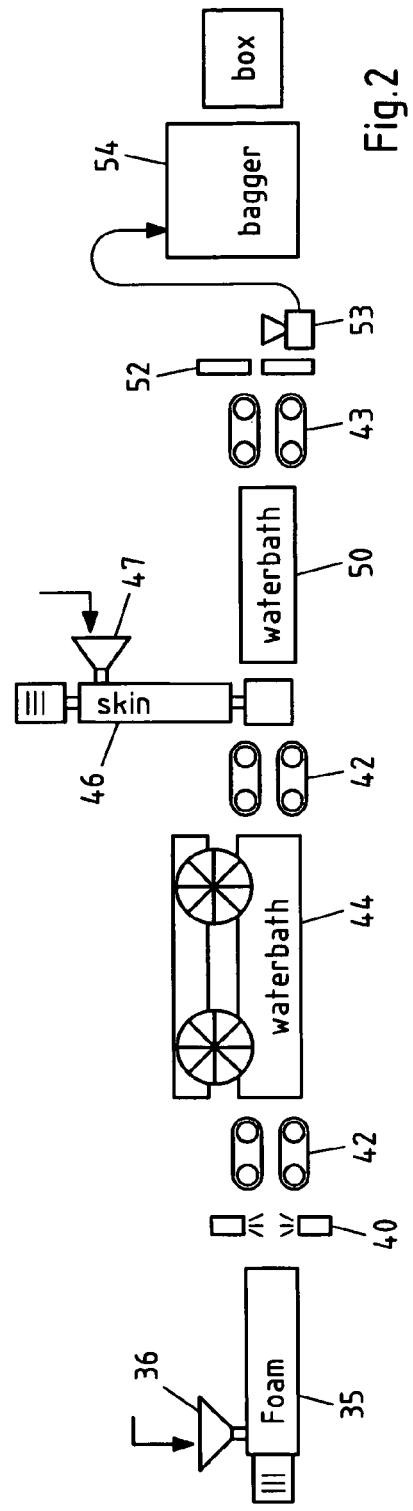

MULTI-COMPONENT SYNTHETIC CLOSURE AND METHOD OF MANUFACTURE

RELATED APPLICATIONS

This application is related to U.S. Provisional Patent Application Ser. No. 61/003,419, filed Nov. 16, 2007 entitled MULTI-COMPONENT SYNTHETIC CLOSURE AND METHOD OF MANUFACTURE.

TECHNICAL FIELD

This invention relates to closures or stoppers for containers containing liquids, low viscosity substrates, and small solids, and more particularly, to closures or stoppers formed from synthetic materials and employable as a bottle stopper for a container.

BACKGROUND ART

In view of the wide variety of products that are sold for being dispensed from containers, particularly containers with round necks which define the dispensing portal, numerous constructions have evolved for container stoppers or closure means for the portals. Generally, products such as vinegar, vegetable oils, laboratory liquids, detergents, honey, condiments, spices, alcoholic beverages, and the like, impose similar requirements on the type and construction of the closure means used for containers for these products. However, wine sold in bottles represents the most demanding product for bottle closure means, due to the numerous and burdensome requirements placed upon the closure means used for wine bottles. In view of these demands, most wine bottle closures or stoppers have been produced from a natural material known as "cork".

Although synthetic materials have been proposed for use as wine bottle stoppers or closures, such products have been unable to satisfy all of the stringent requirements. As a result, cork has remained the dominant material for wine closures, in spite of the numerous inherent problems that exist with cork.

Cork represents the bark of a particular variety of cork oak, quercus suber, a tree of the oak family characteristic of western Mediterranean countries, such as Portugal, Spain, Algeria, Morocco, France, Italy, and Tunisia, that has the ability to renew its bark indefinitely. Cork is a vegetable plant comprising tissue made up of dead microcells, generally 14-sided polyhedrons, slotting in one against the other, with the intercell space filled with a gaseous mixture, essentially atmospheric air but without the carbon dioxide. It is estimated that 1 $cm^3$ of cork numbers 15 to 40 million hexagonal cells with the thickness of the cellular membranes varying between 1 and 2.5 microns.

The suberose texture is not arranged in a uniform fashion. It is criss-rossed within its thickness by pores or ducts with walls more or less lignified, forming the lenticels. These are filled with powder of a reddish-brown color, rich in tannin. The lenticels are permeable to gases and liquids and they are often invaded by molds and other microorganisms.

The unevenness, both in membrane thickness and in the height and diameter of the cell forming the suberose parenchyma, can affect some of the cork's mechanical and physical properties, namely its compressibility and elasticity. The cork oak being able to keep its physiological process active at all times, the difference in cell size and the thickness of the cellular membrane between cork produced in spring and the succeeding autumn leave discernible rings showing the extent of each year's growth.

The contents of newly formed cells disappear during growth and the subsequent process of suberization of the membranes, on completion of which all communication with the plant's living tissues ceases. The uniqueness of quercus suber is the achieved thickness of cork bark, up to several centimeters, which insulates the tree from heat and loss of moisture and protects it from damage by animals.

In order to harvest the thick cork bark for the first time, the growth cycle takes between 20 and 30 years, depending on location, weather conditions etc. yielding the so-called virgin cork. Afterwards, some 10 years are needed between each harvest of cork boards or reproduction cork in order to gain the necessary length or diameter for some corks. Due to this process, the cork used for the manufacture of bottle closures is a reproduction of cork that is formed again after several barking phases.

The properties of cork derive naturally from the structure and chemical composition of the membranes. Because 89.7% of the tissue consists of gaseous matter, the density of cork is extremely low, about 120 to 200 $kg/m^3$, which makes the cork light and a good insulator. Density differences can be explained by the humidity differences, the age and quality of the cork bark and the cork tree and its growth differences. The cellular membranes are very flexible, rendering the cork both compressible and elastic. Elasticity enables it to rapidly recover to its original dimensions after any deformation. Its chemical composition gives the cork the property of repelling moisture. The walls of the cells are crusted with suberin, a complex mixture of fatty acids and heavy organic alcohols.

The value of cork is further increased by its low conductivity of heat, sound and vibration due to the gaseous elements sealed in tiny, impervious compartments. Cork is also remarkably resistant to wear and has a high friction coefficient, thanks to the honeycomb structure of the suberose surface. Cork does not absorb dust and consequently does not cause allergies nor pose a risk to asthma sufferers. It is fire resistant, recyclable, environmentally friendly and a renewable product.

These advantages have made natural cork the preferred bottle closure for wine storage, particularly for medium and high quality wines where tradition, the wine mystique and the bottle opening ritual with a corkscrew, are a very important, though intangible, aspect of the wine consumption. However, numerous disadvantages of natural cork also exist and derive naturally from the structure and chemical composition of the membranes.

Because cork is a natural product, it is a limited resource. Its limitations become even more obvious with the following facts: the natural growing of cork is geographically limited to the western Mediterranean countries; the world wide annual harvest of cork oak bark is 500,000 tons and can barely be increased, because of climatic and ecological reasons; and ten-year cycles are needed between each harvest of cork boards. In order to meet the rising worldwide cork demand, the pare cycles of cork have been shortened, leading to inferior qualities and constantly rising raw material prices.

The irregularities of the cork's structure due to geographic, climatic and ecological reasons cause many quality variances. This creates a complex categorization of qualities and standards. Through different types of washing processes, various chemical agents are combined in order to decontaminate the cork and to treat the appearance of the cork. High quality corks do not need washing. The cork quality is graded, based on the number of lenticels, horizontal and vertical cracks, their sizes, and other cork specific characteristics. The grading process is a subjective task based on statistically significant populations which is difficult to perform due to its natural origin, since every cork looks, feels, functions and smells different.

Wine market experts estimate that 1% to 5% of all bottled wine is spoiled by cork taint. At least six chemical compounds have been associated with cork taint in wines. Most frequently, 2,4,6-trichloranisole (TCA) is the major culprit responsible for the offensive off-odor and impact on the flavor of the wine. TCA has an extremely low threshold for odor detection. It is detectable at concentrations as low as 1 ppt or 1.0 nanogram per liter.

In most cases, cork taint does not involve the wine-making process. Typically, the tainting chemical is not found in vineyards or in parts of the winery where the wine is produced. After the wine is bottled, the defect shows itself, thus spoiling the wine. It is almost exclusively associated with corks.

Also, there is evidence that once the corks have been treated with chlorine, and are brought into interaction with mold fungus through humidity, chloranisole is created. Other types of wine spoilage are caused by oxidation, hydrogen sulfide, volatile acidity, sulfur dioxide, brettanomyces, and mercaptans.

Another problem commonly found with natural cork is leaking bottles. Typically, the lack of tightness between the cork and the neck of the bottle causes 10% to 20% of bottle leakage. However, the majority of wine leakage is caused by passage of the wine through the cork body. These problems are most often found with lower quality cork material, which is typically porous, too soft, out of round, or out of the predetermined specifications.

In view of the fact that wine spoilage is caused by oxidation of the wine, any gas exchange between ambient conditions and the interior of the wine bottle must be avoided. However, many corks are deformed by the chops or jaws of the bottle corking equipment, which enables air exchange and oxidation to occur. Furthermore, when bottles are stored in an environment where ideal humidity is not maintained, optimum functionality of the cork is not achieved and the cork loses its efficiency as a sealing medium by drying out, becoming brittle and/or losing its mechanical properties. These problems often cause the cork to break when pulled out of the bottle or enable wine spoilage to occur. In addition, natural cork absorbs liquids, depending on its structure and quality. This also results in breakage, while the cork is pulled out of the bottle.

Further problems or deficiencies found with natural cork are the propensity of cork worms to store or lay their eggs on the cork material, enabling the larvae to dig gullies into the cork. Consequently, enlarged apertures or channels are formed in the cork, unknown to the bottler, producing unwanted contamination. In addition to these drawbacks, cork powder and other cork impurities are often able to fall into the wine during the corking process, causing further problems for wine bottlers and unwanted surprises for the wine consumer.

In order to avoid some of the difficulties, bottlers have developed various spray coatings, such as paraffins, silicones and polymer materials, in an attempt to ease the movement of the cork into and out of the bottle, as well as to improve the permeability of the cork and fill imperfections in the cork surface. However, no ideal cork spray coating product has been developed to protect a wine corking member from all of the inherent difficulties or drawbacks of the material.

The vast majority of wine-containing bottles are currently being sold with natural cork stoppers. However, due to the inherent problems existing with natural cork, various other products have been developed to close liquid bearing containers, such as wine bottles. These other closures principally comprise structural synthetic plastics, crown cap metal stoppers, aluminum caps, plastic caps and combinations thereof.

In spite of these prior art efforts, a universally applicable closure has not been developed which satisfies all bottlers and consumer requirements. Particularly, the substantially burdensome requirements imposed upon closure means used in the wine industry have generally been employed as the standard that must be attained by a bottle closure that will be accepted by the industry. As a result of these stringent requirements, these prior art products have been incapable of satisfying the requisite needs of the industry.

In particular, one of the principal difficulties to which any bottle closure is subjected in the wine industry is the manner in which the closure is inserted into the bottle. Typically, the closure is placed in a jaw clamping member positioned above the bottle portal. The clamping member incorporates a plurality of separate and independent jaw members which peripherally surround the closure member and are movable relative to each other to compress the closure member to a diameter substantially less than its original diameter. Once the closure member has been fully compressed, a plunger moves the closure means from the jaws directly into the neck of the bottle, where the closure member is capable of expanding into engagement with the interior diameter of the bottle neck and portal, thereby sealing the bottle and the contents thereof.

In view of the fact that the jaw members must be independent of each other and separately movable in order to enable the closure member to be compressed to the substantially reduced diameter, each jaw member comprises a sharp edge which is brought into direct engagement with the closure member when the closure member is fully compressed. Depending upon the composition of the closure member, score lines are frequently formed on the outer surface of the closure member, which prevents a complete, leak-free seal from being created when the closure member expands into engagement with the bottle neck.

As a result of this sealing system, closure members other than cork have not been accepted by the wine industry, due to their inability to withstand this conventional bottling and sealing method. Furthermore, many cork sealing members also incur damage during the bottling process, resulting in leakage or tainted wine.

Another problem inherent in the wine industry is the requirement that the wine stopper must be capable of withstanding a substantial pressure build up that occurs during the storage of the wine product after it has been bottled and sealed. Due to natural expansion of the wine during hotter months, pressure builds up, imposing a burden upon the bottle stopper that must be resisted without allowing the stopper to be displaced from the bottle. As a result, the bottle stopper employed for wine products must be capable of secure, intimate, frictional engagement with the bottle neck in order to resist any such pressure build up.

A further problem inherent in the wine industry is the requirement that secure, sealed engagement of the stopper with the neck of the bottle must be achieved virtually immediately after the stopper is inserted into the neck of the bottle. During normal wine processing, the stopper is compressed, as detailed above, and inserted into the neck of the bottle to enable the stopper to expand in place and seal the bottle. However, such expansion must occur immediately upon insertion into the bottle since many processors tip the bottle onto its side or neck down after the stopper is inserted into the bottle neck, allowing the bottle to remain stored in this position for extended periods of time. If the stopper is unable to rapidly expand into secure, intimate, frictional contact and engagement with the walls of the neck of the bottle, wine leakage will occur.

A further requirement imposed upon closures or stoppers for wine bottles is the requirement that the closure be removable from the bottle using a reasonable extraction force. Although actual extraction forces extend over a wide range, the generally accepted, conventional extraction force is typically below 100 pounds.

In achieving a commercially viable stopper or closure, a careful balance must be made between secure sealing and providing a reasonable extraction force for removal of the closure from the bottle. Since the requirements for these two characteristics are in direct opposition to each other, a careful balance must be achieved so that the stopper or closure is capable of securely sealing the wine in the bottle, preventing both leakage and gas transmission, while also being removable from the bottle without requiring an excessive extraction force.

Another requirement for commercially viable wine stoppers or closures is the ability for printed material to be placed on the outer surface of the wine closure or stopper in order to allow the wine company to display any desired names, logos, and the like directly on the wine stopper. Depending upon the particular composition of the wine stopper, the requirement for enabling printed material to be placed thereon often imposes difficult conditions and limitations on the construction and functioning of the stopper for its intended purpose.

It has been found with many prior art closures that the process required for enabling the synthetic closure to receive and retain the ink for displaying printed indicia and/or logos also interferes with maintaining a reasonable extraction force for the synthetic closure. In this regard, synthetic closures are required to be specially treated, in order to enable the surface of the synthetic closure to accept the printing ink. Typically, this treatment requires the outer surface of the synthetic closure to be exposed to a high-intensity corona, plasma, or flame.

Although the exposure of the synthetic closure to a high-intensity beam of corona, plasma, or flame typically enables the surface of the closure to receive and retain printing inks, the treatment has been found to have a deleterious effect on the outer surface of the synthetic closure. In this regard, it has been found that extraction forces required to remove the treated synthetic closure from a bottle or container continuously increase with the passage of time. As a result, one of the principal requirements for an effective synthetic closure is not attainable by such prior art products.

Furthermore, printing on the surface of polymeric material has its challenge regarding adhesion, scuff resistance, permanency of the print as well as approval of inks for use in contact with food. Common printing technologies in the field are based on wet ink solutions using either solvent-based, water-based or UV-curable inks. Most any wet ink process requires pre-treating the surface of the polymer in order to increase the bond ability and wet ability of the polymer. This is generally accomplished using corona, flame or plasma treatment process. In the case of UV-curable inks, the exposure to UV light causes the UV initiators in the ink to cross-link and form a more scratch resistant print. It has been documented that using pretreatment processes for preparing the surface of synthetic corks can negatively impact the polymer-glass interface in a way that excessive extraction forces are required to remove the closure from the bottle.

It is highly desirable to accomplish a scratch-resistant print on the surface of the cork to avoid any ink loss or ink transfer to the bottle neck during extraction of the closure. More recently, such developments have been accomplished by using hot stamping and laser marking technologies. Both combine the advantage of not requiring pre-treatment or curing operations. However, in the case of hot stamping the process is governed by heat transfer and is yielding fairly low rates. In the case of laser marking, polyolefin materials require the use of a marking additive to increase absorption and increase marking speed. Those additives have in the past been very costly. In a case of a single-component closure, the additive has to be incorporated into the entire closure, although only marking close to the surface is required.

State-of-the-art printing technologies in the field rely on the use of cut corks for the printing process. This is particularly true for injection molded corks, but also applies to extruded corks. As an "offline" process, additional process steps of handling, storing, feeding and waiting are required prior to the printing process. In order to reduce these non-value added times, it is highly desirable to implement a printing process inline to the extrusion process and eliminate most or all non-value added times associated with the printing process.

In addition to the printing process, the closure requires a surface lubrication to enable cork insertion and extraction into the bottle. It is of great interest to also include this process into the extrusion process in order to obtain a finished product at the end of the extrusion line that can readily be packed and shipped. Lubricating agents used in the industry include silicone oils and paraffin. Printing after lubricating the surface is virtually impossible for most wet-ink and hot stamping processes. In the case of laser marking, a print after coating is obtainable. However, the use of additives and the capital cost of the equipment is cost prohibitive to the manufacturing process. In the case of producing a single-component closure, surface coating after inline printing could take the shape of inline spray-coating the surface of the extrusion rod after printing prior to cutting the corks. In the case of a multi-component closure (core with an outer layer) and crosshead extruding the product, it is possible to print after extruding the core and incorporating the lubrication function into the outer layer (e.g. incorporation of mineral oils or silicone oils into the formulation of the outer layer). Lubrication of the outer layer can be effected by adding a suitable additive or lubrication polymer (e.g. Teflon) into the formulation of the outer layer.

Therefore, it is a principal object of the present invention to provide closure means for containers which is manufacturable from synthetic materials and effectively closes and seals any desired bottle, container, package and the like.

Another object of the present invention is to provide a synthetic closure having the characteristic features described above which is manufacturable on a continuing production basis, thus providing lower manufacturing costs compared to natural or synthetic (structured) closures and satisfying industry requirements for a removable bottle stopper which is producible substantially more economically than cork closure/stoppers.

Another object of the present invention is to provide a synthetic closure having the characteristic features described above which meets or exceeds all of the requisite physical characteristics found in natural closures or stoppers such as cork.

A further object of the present invention is to provide a synthetic closure or stopper having the characteristic features described above which is capable of simulating all of the visually aesthetic and tactile characteristics found in natural stoppers, such as cork, so as to be effectively a substitute for cork stoppers or closures for the wine industry, particularly its ends users in both appearance and feel.

Another object of the present invention is to provide a synthetic closure or stopper having the characteristic features described above which is capable of being employed in conventional bottling equipment for being inserted into a bottle container without experiencing any unwanted physical damage.

Another object of the present invention is to provide a synthetic closure or stopper having the characteristic features described above that can be substituted for a cork stopper in wine bottles, providing all of the desirable characteristics of conventional cork stoppers while also being removable from the bottle in the conventional manner without breaking.

Another object of the present invention is to provide a synthetic closure or stopper having the characteristic features described above, which is physiologically neutral, capable of being sterilized, as well as capable of being formed to visually simulate any desired classification of natural cork.

A further object of the present invention is to provide a synthetic closure or stopper having the characteristic features described above which is odorless, remains odorless in position, is tasteless, and only absorbs limited amounts of water.

Another object of the present invention is to provide a synthetic closure or stopper having the characteristic features described above which is unaffected by diluted acids and bases as well as unaffected by most oils.

Another object of the present invention is to provide a synthetic closure or stopper having the characteristic features described above which does not shrink, does not age, does not absorb mold or fungus, and resists damage from insects.

Another object of the present invention is to provide a synthetic closure or stopper having the characteristic features described above which can be mass produced on a continuing basis and eliminates any spoilage of wine due to cork taint.

Another object of the present invention is to provide a synthetic closure or stopper having the characteristic features described above which is capable of being removed from the container using conventional extraction forces, which forces remain reasonably constant regardless of the period of time over which the stopper has been in the bottle.

Another object of the present invention is to provide a synthetic closure or stopper having the characteristic features described above which is capable of receiving printed material thereon without requiring special treatment to the outer surface thereof.

Another object of the present invention is to provide a synthetic closure or stopper having the characteristic features described above which is capable of being easily inserted into any desired bottle container, as well as being removed from the bottle or container without requiring excessive force.

Another object of the present invention is to provide a synthetic closure or stopper having the characteristic features described above which is capable of providing a wide variety of alternate surface textures or treatments or visual appearances.

Another object of the present invention is to provide a synthetic closure or stopper having the characteristic features described above which consistently and uniformly provides all required physical attributes for a closure without requiring any special treatments or surface coatings to be applied to the outer surface thereof.

Other and more specific objects will in part be obvious and will in part appear hereinafter.

SUMMARY OF THE INVENTION

By employing the present invention, all of the difficulties and drawbacks found in the prior art have been completely overcome and a mass producible, resilient, synthetic bottle closure is realized by achieving a synthetic, extruded, foamed polymer core peripherally surrounded and integrally bonded with a plurality of cooperating, synthetic, separate, independent, extruded, outer layers or skin members. The present invention can be employed on any desired product, whether the product is a liquid, a viscous material, or a solid distributed in a bottle or container and dispensed through the open portal of the container neck.

As will become evident from the following detailed disclosure, the multi-component synthetic closure of the present invention may be employed as a bottle closure or stopper for any desired product. However, for the reasons detailed above, wine products impose the most burdensome standards and requirements on a bottle closure. Consequently, in order to clearly demonstrate the universal applicability of the multi-component synthetic closure of the present invention, the following disclosure focuses on the applicability and usability of the multi-component synthetic closure of the present invention as a closure or stopper for wine containing bottles. However, this discussion is for exemplary purposes only and is not intended as a limitation of the present invention.

As discussed above, a bottle closure or stopper for wine must be capable of performing numerous separate and distinct functions. One principal function is the ability to withstand the pressure build up due to temperature variations during storage, as well as prevent any seepage or leakage of the wine from the bottle. Furthermore, a tight seal must also be established to prevent unwanted gas exchange between ambient conditions and the bottle interior, so as to prevent any unwanted oxidation or permeation of gases from the wine to the atmosphere. In addition, the unique corking procedures employed in the wine industry also impart substantial restrictions on the bottle closure, requiring a bottle closure which is highly compressible, has high immediate compression recovery capabilities and can resist any deleterious effects caused by the clamping jaws of the bottle closure equipment.

Although prior art synthetic products have been produced in an attempt to satisfy the need for alternate bottle closures employable in the wine industry, such prior art systems have been incapable of meeting all of the stringent requirements and demands imposed upon a bottle closure for wine products. However, by employing the present invention, all of the prior art inabilities have been obviated and an effective, easily employed, mass-produced synthetic closure has been realized.

The present invention overcomes all of the prior art problems by achieving a multi-component synthetic closure which possesses physical properties substantially equal to or better than the physical properties found in cork material, which has caused such cork material to be the principal closure material for wine bottles. In the present invention, the prior art failings have been overcome by achieving a multi-component synthetic bottle closure which incorporates a central core member peripherally surrounded by and integrally bonded to a separate, independent outer peripheral layer or skin member which imparts additional, desirable physical characteristics to the effective outer surface of the synthetic bottle closure. By employing multi-components to form the synthetic bottle closure of the present invention, all of the prior art difficulties and drawbacks have been eliminated and an effective, multi-purpose, easily employed and economically mass produced synthetic closure is realized.

The multi-component synthetic bottle closure of the present invention comprises, as its principal component, the core member which is formed from extruded, foamed, plastic polymers, copolymers, or homopolymers. Although any known foamable plastic material can be employed in the extrusion process for developing the bottle closure of the present invention, the plastic material must be selected for producing physical properties similar to natural cork, so as to be capable of providing a synthetic closure for replacing natural cork as a closure for wine bottles.

By employing the present invention, a synthetic bottle closure is produced in a highly automated, high-tech extrusion process with product tolerances being closely maintained. As a result, various prior art difficulties encountered with cork products being out of round or having improper diameters are completely eliminated.

Depending upon the sealing process employed for inserting the synthetic closure of the present invention in a desired bottle, additives, such as slip additives, may be incorporated into the outer, peripherally surrounding layer of the synthetic closure of the present invention to provide lubrication of the synthetic closure during the insertion process. In addition, other additives typically employed in the bottling industry may also be incorporated into the synthetic closure of the present invention for improving the sealing engagement of the synthetic closure with the bottle as well as reducing the extraction forces necessary to remove the synthetic closure from the bottle for opening the bottle.

In the present invention, the unique synthetic bottle closure is realized by forming an outer layer peripherally surrounding the core member in intimate, bonded, interengagement therewith. The outer, peripheral layer of the synthetic closure is formed from foam or non-foam plastic material. However, the outer peripherally surrounding layer is formed with a substantially greater density in order to impart desired physical characteristics to the synthetic bottle closure of the present invention. In addition, in accordance with the teaching of the present invention, a unique manufacturing process is provided in which a completed multi-component synthetic closure is achieved incorporating printed indicia formed thereon, in a continuous manufacturing operation. In the manufacturing operation of the present invention, unwanted and costly manual handling of the synthetic closure during its manufacture is eliminated.

In accordance with the preferred embodiment of the present invention, a continuous manufacturing operation is provided wherein the core member of the synthetic closure is formed by a continuous extrusion process which enables the core to be manufactured as an elongated, continuous length of material. As the continuous elongated length of extruded material forming the central core is advanced from the extruder towards an outer skin forming station, the central core passes through a printing station.

As the elongated continuous length of material forming the central core passes through the printing station operation, any desired indicia, graphics, symbols, codes, and the like are printed directly on the outer surface of central core, in a printing operation while the product is being continuously extruded. In this regard, the printed indicia is placed on the outer surface of the central core in a repeating pattern, with the pattern of the indicia being spaced apart from each other with the required distance for enabling individual synthetic closures to be formed from the elongated length of material when the material is cut in the desired lengths.

As is more fully detailed below, although the desired indicia is repeatedly printed on the single, elongated length of material, each printed indicia represents the designation or information desired for each individual synthetic closure. As a result, when the elongated, longitudinally extending length of extruded material is cut into the desired lengths for forming individual synthetic closures, the resulting product is complete and ready for shipment.

Furthermore, in accordance with the present invention, the outer layer or skin surface forming the multi-component synthetic closure is formed about the central core after the printing operation is completed. In this way, the elongated length of material is produced in a continuous production operation enabling all production steps to be completed prior to the formation of the individual synthetic closure members by cutting the elongated length of extruded material in the desired manner.

Furthermore, by forming the outer layer or skin surface on the central core after the printing operation is completed, protection of the printed material is provided, thereby eliminating any possibility of ink transfer or smudging as frequently occurs with prior art product. In addition, since the material employed for the outer layer or skin surface is selected for its visual transparency, the printed indicia formed on the central core member are easily readable.

In an alternate embodiment of the present invention, the printing station is positioned for applying the desired indicia, graphics, symbols, codes, and the like directly on the outer surface of the outer layer or skin surface of the multi-component synthetic closure of the present invention. In this alternate embodiment, the elongated length of material is completely produced in a continuous, in-line production operation with the printing operation occurring after the complete formation of the multi-component synthetic closure, but prior to the cutting of the elongated length of extruded material into individual desired lengths. As a result, a highly efficient continuous production operation is achieved, eliminating many of the prior art difficulties and drawbacks in printing the desired indicia on the surface of synthetic closures.

By achieving a multi-component synthetic bottle closure in accordance with the present invention, a bottle closure is realized which is capable of satisfying all requirements imposed thereon by the wine industry, as well as any other bottle closure/packaging industry. As a result, a synthetic bottle closure is attained that can be employed for completely sealing and closing any desired bottle for securely and safely storing the product retained therein, with any desired markings and/or indicia printed thereon.

The invention accordingly comprises an article of manufacture possessing the features, properties, and relation of elements which will be exemplified in the article hereinafter described, and the scope of the invention will be indicated in the claims.

THE DRAWINGS

For a fuller understanding of the nature and objects of the invention herein described, reference should be had to the following detailed description taken in connection with the accompanying drawings, in which:

FIG. 1 is a perspective view of the synthetic closure produced by employing the manufacturing system of the present invention;

FIG. 2 is a diagrammatic view of the manufacturing equipment employed for producing the synthetic closure of the present invention using the preferred manufacturing method of the invention;

DETAILED DESCRIPTION

Figure 3:
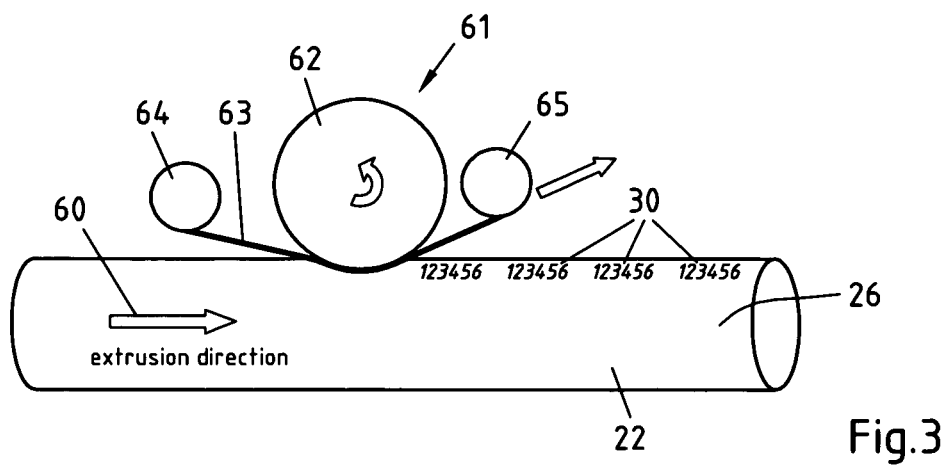
FIGS. 3-9 are a series of diagrammatic views depicting alternate printing techniques and systems that may be employed in implementing the present invention.

By referring to FIGS. 1-9, along with the following detailed disclosure, the construction and production method for the multi-component synthetic bottle closures of the present invention can best be understood. In these Figures, as well as in the following detailed disclosure, the multi-component synthetic closure of the present invention, and its method of production, is depicted and discussed as a bottle closure for wine products. However, as detailed above, the present invention is applicable as a synthetic closure for use in sealing and retaining any desired product in any desired closure system. However, due to the stringent and difficult demands and requirements placed upon closures for wine products, the following detailed disclosure focuses upon the applicability of the synthetic bottle closures of the present invention as a closure for wine bottles. However, it is to be understood that this detailed discussion is provided merely for exemplary purposes and is not intended to limit the present invention to this particular application and embodiment.

In FIG. 1, the preferred construction of multi-component synthetic closure 20 is depicted comprising a generally cylindrical shape formed by core member 22 and outer layer or skin layer 24 which peripherally surrounds and is intimately bonded to core member 22. In the preferred embodiment, core member 22 comprises a substantially cylindrically shaped surface 26, terminating with substantially flat end surfaces 27 and 28.

In the preferred embodiment, outer layer or skin layer 24 is intimately bonded directly to core member 22, peripherally surrounding and enveloping surface 26 of core member 22. Outer layer or skin layer 24 incorporates exposed surface 29, which comprises a substantially cylindrical shape and forms the outer surface of multi-component synthetic bottle closure 20 of the present invention, along with flat end of surfaces 27 and 28.

In addition, as is more fully detailed below, core member 22 incorporates printed indicia 30 formed on outer surface 26 thereof which is placed thereon prior to the formation of outer layer or skin layer 24 on surface 26 of core member 22. In this way, outer layer or skin layer 24 overlies and protects printed indicia 30 placed on surface 26 of core member 22. Furthermore, in accordance with the present invention, indicia 30 comprises any desired printed material, graphics, numbers, symbols, codes, designations, data matrix codes, linear barcodes, generic printed patterns, custom printed patterns, traceability numbers, labels, generic artwork, specific artwork, invisible marks, covert marks, and the like.

As briefly discussed above, outer layer or skin layer 24 must be constructed from material which provides sufficient transparency for enabling indicia 30 printed on core member 22 to be easily visible therethrough. In addition to selecting materials which will provide the desired transparency, the thickness of outer layers/skin layer 24 is also controlled in order to assure the visibility of indicia 30 through outer layer/ skin layer 24.

By referring to FIG. 2, along with the following detailed discussion, the preferred production method of the present invention wherein multi-component synthetic bottle closure 20 is formed, with the desired indicia pre-printed thereon during the forming operation. In accordance with this invention, the first production step or stage is the use of extruder 35.

In order to employ extruder 35, the desired materials or ingredients are fed into hopper 36 for being processed through extruder 35 to produce core member 22 as a continuous, elongated length of material. Typically, core member 22 is foamed during processing through extruder 35. However, foam material is not required for forming core member 22.

As core member 22 emerges from extruder 35 as a continuous, elongated length of material, core member 22 passes through in-line printing station 40. In accordance with the present invention, printing station 40 may comprise any desired construction which achieves effective printing, marking, labeling, and/or decorating on the surface of core member 22. Although not all inclusive, such printing systems include one or more selected from the group consisting of dry offset printers, inkjet printers, hot stamping printers, laser printers, laser marking, hot melt ink jet printing, engraving, offset printing, dry offset printing, direct gravure printing, tampon printing, and the like. In addition, if desired, pretreatment of the surface of core member 22 can be provided and would typically include corona treatment, flame treatment, plasma treatment, and/or UV treatment. Furthermore, print curing may also be provided using such means as UV light exposure and/or infrared heat exposure.

According to the preferred embodiment, an inkjet printing system utilizing a curable ink such as a UV curable ink or an IR curable ink may be employed. Ink curing may be provided by using such means as UV light exposure and/or infrared heat exposure after passage of the elongated length of material through the printer system. In addition, if desired, the outer surface of the elongated, continuous, length of material forming the core member after passage of the elongated length of material through the printer system and/or curing system can be post treated. Post treatment would typically include corona treatment, flame treatment, plasma treatment and/or UV treatment. The post treatment of the printed elongated, continuous length of material forming the core member is preferably effected prior to applying the peripheral layer.

While in FIG. 2 the printing station 40 is located immediately after the extruder 35, it is also possible to place the printing station at other positions in the production line, e.g. after the water bath 44 and/or before or after one of the pullers 42.

As is evident from the foregoing discussion as well as the further detailed disclosure provided herein, the printing of any desired indicia on the surface of core member 22 while core member 22 is being manufactured and processed as a continuous, elongated length of material represents a unique advance in achieving a high-speed, low cost, labor-free or labor-reduced production operation. As a result, by employing the manufacturing process of the present invention, multi-component synthetic closures are produced substantially more efficiently, effectively, and less expensively than prior art constructions. In addition, the present invention reduces and virtually eliminates numerous production difficulties encountered by printing applications performed on the final product, as required in the prior art. As a result, the present invention represents a unique advance in achieving higher speed and lower-cost production operations.

As shown in FIG. 2, the continuous, elongated length of material forming core member 22 is advanced through the stages of the production operation by employing pullers 42. Typically, pullers 42 comprise a pair of continuously rotating endless loop belt members mounted in cooperating, spaced relationship with each other for enabling the continuous length of material forming core member 22 to pass therebetween and be continuously advanced by the movement of the belt members. In this way, core member 22 continuously moves at a controlled rate of speed through the entire production operation.

After passage of core member 22 through printer 40, core member 22 is passed through water bath 44 for controlling the temperature of core member 22. Once core member 22 emerges from water bath 44 and passes through pullers 42, core member 22 is advanced into extruder 46 for applying the outer layer or skin layer 24 about surface 26 of core member 22.

Typically, extruder 46 comprises a crosshead extrusion system or a co-extrusion system for providing the desired outer layer or skin layer 24 to core member 22. In this application, the terms "crosshead extrusion" and "co-extrusion" are used interchangeably as equivalent terms. As a result, regardless of the system employed, whether these systems or any other system, the present invention focuses upon the application of outer layer/skin layer 24 on surface 26 of core member 22 after the desired indicia has been printed on surface 26 of core member 22.

Typically, extruder 46 operates in a manner similar to extruder 35 by having the desired material fed into hopper 47 which is then processed and passed through extruder 46 for delivering and applying the desired outer layer/skin layer 24 to core member 22. In this regard, using the equipment detailed above and well known in the industry, extruder 46 is able to apply a controlled, thin layer of material intimately bonded to core member 22 in peripheral, surrounding interengagement therewith, thereby achieving the desired outer layer 24 with the desired physical characteristics. In addition, by incorporating material which achieves sufficient transparency, the indicia printed on core member 22 is readily visible through outer layer/skin layer 24.

Once outer layer/skin layer 24 has been applied to core member 22, the resulting product is fed to water bath 50 for controlling the temperature of the completed product. The movement of the elongated length of material comprising core member 22 and outer layer/skin layer 24 continues through water bath 50 and through the final stages of the operation. This continued movement is provided by puller assembly 43.

In this final stage, the elongated length of material comprising core member 22 and outer layer/skin layer 24 is fed through cutting blade members 52 which repeatedly cut the elongated length of material into the desired length for producing synthetic closure 20. As each synthetic closure 20 is formed by the cutting operation, synthetic closures 20 are fed into hopper 53 which in turn feeds synthetic closures 20 to automatic bagging and boxing system 54. In this system, the synthetic closures are fed into a bagging assembly and then placed in a box for shipment.

As discussed above, in an alternate embodiment of the present invention, the desired indicia 30 is printed directly on outer layer or skin layer 24 after outer layer of skin layer 24 is affixed to surface 26 of core member 22. By employing this alternate process, a continuous, in-line, production operation is realized with printed indicia 30 being applied to the continuous elongated length of multi-component synthetic closure 20 prior to passage of the multi-component elongated length of material through cutting blade members 52 for effectively forming synthetic closure 20 in the desired length.

In this alternate production operation, printing station 40 is preferably positioned between water bath 50 and puller assembly 43 or between puller assembly 43 and cutting blades 52. By placing printing station 40 in one of these alternate positions, indicia 30 is easily applied to the surface of outer layer or skin layer 24 in a continuous, in-line printing operation for enabling the benefits of the present invention to be realized.

Once the printing step has been completed, the elongated length of material comprising core member 22 and outer layer/skin layer 24 is fed through cutting blade members 52 for repeatedly cutting the elongated length of material into the desired length for producing synthetic closures 20 in a highly efficient, trouble-free manner. In this way, this alternate process also eliminates all of the difficulties and drawbacks found in prior art synthetic closure production systems, wherein printing is required to be achieved on the individual closure members after their production.

As is evident from the foregoing detailed disclosure, the production system of the present invention is capable of providing a completed synthetic closure 20 in a continuous, in-line operation with virtually no manual intervention. By employing this invention, the entire system operates automatically, producing synthetic closure 20 having core member 22 which is peripherally surrounded and intimately bonded to outer layer/skin layer 24 with any desired indicia 30 printed on the surface of core member 22 prior to the application of outer layer/skin layer 24. In this way, the present invention eliminates all of the difficulties and drawbacks found in prior art synthetic closure systems, wherein printing is required to be achieved on individual closure members after their production.

By referring to FIGS. 3-9, along with the following detailed discussion, the preferred printing techniques or operations for forming any desired indicia on the surface of core member 22 can best be understood. However, it should also be understood that the following discussion as well as the embodiments shown in FIGS. 3-9 are shown for exemplary purposes only and are not intended as a limitation of the present invention to the particular techniques or operations disclosed herein.

In FIG. 3, an in-line foil or ribbon printing system is depicted wherein the elongated length of material forming core member 22 is advanced in the direction represented by arrow 60 through printing assembly 61. In this regard, printing assembly 61 comprises printhead 62, print ribbon 63 and transfer spools 64 and 65. In this embodiment, printing ribbon 63 is transferred from spool 64 to spool 65 for continuously advancing ribbon 63 in the desired direction.

In addition, printhead 62 continuously rotates about its central axis and incorporates the desired indicia formed on rotating printhead 62. As core member 22 advances into contact with printhead 62 as ribbon 63 passes therebetween, the indicia contained on printhead 62 is imparted to the surface of core member 22, as depicted in FIG. 3. In this way, the desired indicia 30 is continuously printed upon the surface of core member 22 as core member 22 continuously advances in the direction of the arrow 30.

As discussed above, indicia 30 may comprise any desired printed material including data matrix codes, linear bar codes, generic print patterns, custom print patterns, logos, artwork, symbols, traceability numbers, and the like. For exemplary purposes, traceability numbers are depicted as indicia 30 in FIGS. 3-9.

In most European countries, traceability numbers are printed on the surface of synthetic closures due to requirements in most of these countries. Typically, traceability numbers are five to six digit numbers printed in a large font size of 10 points. In closures formed of natural cork, the numbers are placed thereon by branding or by an ink process, in particular by a dry ink process. In closures formed from synthetic materials, the traceability numbers typically are incorporated as part of the artwork.

In addition to depicting various alternate methods for printing traceability numbers during the in-line extrusion process in accordance with the present invention, the following detailed disclosure also describes a method for separating or decoupling the printing operation from the cutting operation, wherein individual synthetic closures are formed from the elongated length of material. In addition, as is evident from the foregoing detailed disclosure, any desired art work may also be printed on the synthetic closures manufactured in accordance with the present invention, along with any traceability numbers that are desired.

Figure 4:
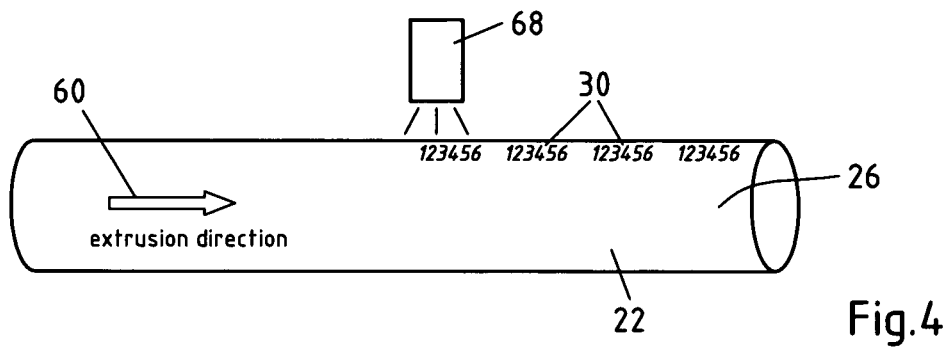
Figure 5:
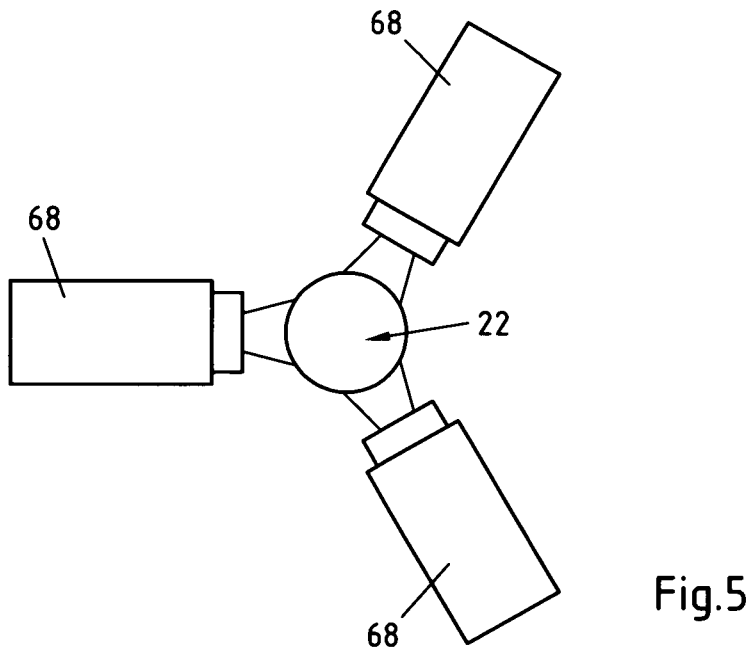

In FIGS. 4 and 5, an in-line inkjet, in-line laser marking, or in-line hot melt printing operation is depicted. As shown, one or more ink jet printing heads, laser marking heads, or hot melt printing heads 68 are positioned in association with the continuous length of material forming core member 22 for printing the desired indicia 30 on the surface of core member 22 as core member 22 advances in direction 60. As shown, a single printhead 68 or a plurality of printheads 68 can be employed for achieving the desired printing of indicia 30 on the surface of core member 22.

Figure 6:
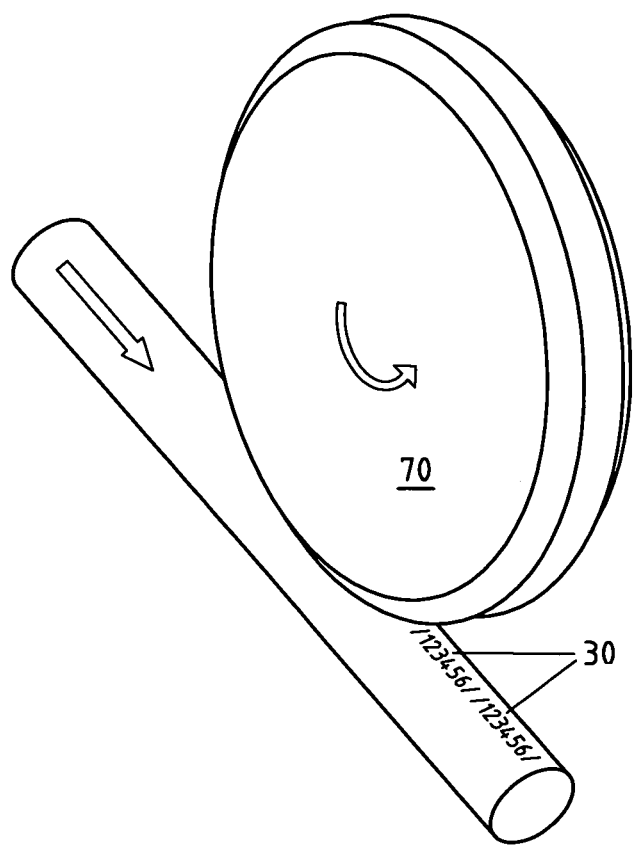

In FIG. 6, an alternate printing method is depicted wherein indicia 30 is printed on the outer surface of core member 22 by employing rotating print wheel 70. As depicted, print wheel 70 incorporates the desired indicia formed on the outer edge thereof and is constructed for having ink applied to this outer surface for effectively printing the desired indicia 30 on the surface of core member 22 as core member 22 advances into contact with the outer edge of rotating wheel 70. In this way, the desired indicia 30 is quickly and easily effectively printed on the outer surface of core member 22 as core member 22 continues to move through the manufacturing operation detailed above.

Figure 7:
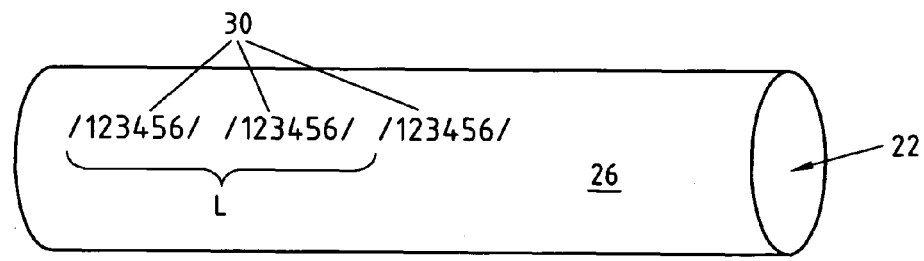
Figure 8:
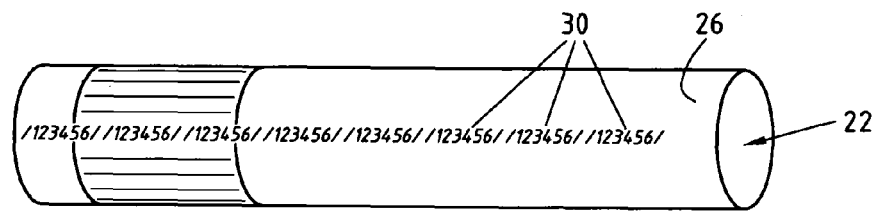

In FIGS. 7 and 8, the decoupling or separation of the printing operation from the cutting operation in accordance with the production system of the present invention is fully depicted. In this regard, the use of traceability numbers is employed to explain the decoupling or separation operation.

As depicted, any desired indicia 30, including elongated traceability numbers, are capable of being printed on the surface of core member 22 during the production of multi-component synthetic closure 20 of the present invention as long as indicia 30 is constructed with an overall length which is less than the length of synthetic closure 20. As best seen in FIG. 8, regardless of the position of indicia 30 on core member 22, the final product of synthetic closure 20 when cut must incorporate indicia 30 in its entirety since the overall length of indicia 30 is substantially less than the overall length of synthetic closure 20. As a result, by properly constructing and designing indicia 30, assurance is provided that each synthetic closure 20 incorporates indicia 30 in its entirety.

If desired, the precise position of registry of indicia 30 on closure 20 can be achieved. In this regard, start/stop signals and/or eye marks may be printed on the surface of core member 22 in order to position indicia 30 in a specific location on synthetic closure 20 when synthetic closure 20 is cut during the forming step. In addition, vision control systems or vision algorithms can be employed, if desired, to assure the desired positioning is achieved. However, the incorporation of these systems can be avoided by employing the decoupling system detailed above.

By employing the methodology of the present invention, the length of the closure can be changed during the production operation without incurring any difficulty or upsetting the registry of indicia 30 on the final synthetic closure product. However, the precise location of the indicia on closure 20 typically requires the additional equipment detailed above.

Figure 9:
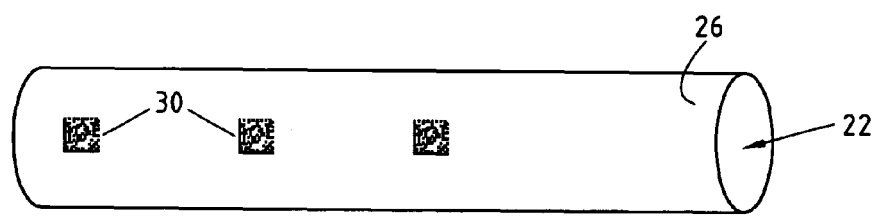

Finally, in FIG. 9, indicia 30 is depicted as comprising data matrix codes printed on core member 22 using any of the printing techniques detailed above. Although FIG. 9 depicts only data matrix codes, it is evident from the foregoing detailed discussion that indicia 30 may comprise any configuration or visual appearance which may be desired.

It will thus be seen that the objects set forth above, among those made apparent from the preceding description, are efficiently obtained and, since certain changes may be made in carrying out the above method without departing from the scope of this invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Having described our invention, what we claim as new and desire to secure by Letters Patent is:

1. A method for mass-producing a plurality of multi-component thermoplastic closures for use in sealing fluid products in a container having a portal forming a neck of the container, said method comprising the steps of:
   A. extruding a continuous, elongated, substantially cylindrically shaped length of material to form a central core member, said central core member comprising a continuous elongated form with a continuous length equivalent to a combined length of the plurality of multi-component thermoplastic closures, and said central core member being devoid of a skin layer or covering layer;
   B. passing the central core member being devoid of a skin layer or covering layer through a printer system that repeatedly prints pre-determined, desired ink-based indicia directly on an outer cylindrical surface of said central core member;
   C. separately extruding a visually transparent, separate and independent layer of plastic material in intimate bonded engagement with the central core member, said separate and independent layer of plastic material consisting of a single layer of material, peripherally surrounding and substantially enveloping the outer cylindrical surface of the central core member and being in overlying relationship with the indicia repeatedly printed on the outer cylindrical surface of said central core member, thereby forming a dual component product; and
   D. repeatedly cutting the dual component product in a plane substantially perpendicular to a central axis of the central core member, thereby forming the plurality of multi-component thermoplastic closures, with each multi-component thermoplastic closure having a desired length for insertion and retention in the portal of the neck of the container, and with each multi-component thermoplastic closure having a core with the desired indicia contained thereon and visible through the separate and independent layer of plastic material.

2. The method defined in claim 1, wherein the central core member is further defined as comprising medium density or low density, closed cell plastic material comprising at least one material selected from the group consisting of inert polymers, homopolymers, and copolymers.

3. The method defined in claim 2, wherein said closed cell plastic material is further defined and as comprising closed cell foam plastic comprising at least one material selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, ethylene-butyl-acrylate copolymers, ethylene-propylene-rubber, styrene butadiene rubber, ethylene-ethyl-acrylic copolymers, ionomers, polypropylenes, and copolymers of polypropylene and copolymerizable ethylenically unsaturated commoners.

4. The method defined in claim 3, wherein said separate and independent layer of plastic material is further defined as comprising at least one material selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, ethylene-butyl-acrylate copolymers, ethylene-propylene-rubber, styrene butadiene rubber, ethylene-ethyl-acrylic copolymers, ionomers, polypropylenes, and copolymers of polypropylene and copolymerizable ethylenically unsaturated commoners.

5. The method defined in claim 1, wherein the step of extruding the separate and independent layer of plastic material in intimate bonded engagement with the central core member is further defined as being performed using crosshead extrusion equipment.

6. The method defined in claim 1, wherein the printer system is further defined as comprising one item selected from the group consisting of printing equipment constructed for providing one or more methods selected from the group consisting of printing, marking, labeling, decorating, laser marking, hot stamping, inkjet printing, hot melt inkjet printing, engraving, offset printing, dry offset printing, direct gravure printing, and tampon printing.

7. The method defined in claim 1, wherein the indicia printed on the outer cylindrical surface of the central core member is further defined as comprising at least one item selected from the group consisting of graphics, symbols, codes, numbers, designations, data matrix codes, linear barcodes, generic printed patterns, custom printed patterns, traceability numbers, labels, generic artwork, specific artwork, invisible marks, covert marks, and the like.

8. The method defined in claim 1, wherein the method further comprises the step of pretreating the outer cylindrical surface of the central core member prior to passage of the central core member through the printer system.

9. The method defined in claim 8, wherein said pretreatment is further defined as comprising at least one item selected from the group consisting of corona treatment, flame treatment, plasma treatment, UV light exposure, and infrared heat exposure.

10. The method defined in claim 1, wherein the method comprises the additional step of providing continuous movement of the central core member through the steps A-D.

11. The method defined in claim 10, wherein said continuous movement is provided by passing the central core member through a puller assembly.

12. The method defined in claim 1, wherein the printer system comprises an inkjet printer system.

13. The method defined in claim 12, wherein the inkjet printer system utilizes a UV curable inkjet ink.

14. The method defined in claim 1, wherein the method further comprises the step of curing the printed indicia after passage of the central core member through the printer system.

15. The method defined in claim 1, wherein the method further comprises the step of post treating the outer cylindrical surface of the central core member after passage of the central core member through the printer system.

16. The method defined in claim 1, wherein the method further comprises the step of printing additional pre-determined, desired indicia on a surface of said separate and independent layer of plastic material.

17. The method defined in claim 1, wherein said separate and independent layer of plastic material is further defined as comprising a lubricant in order to impart a lubrication function into said layer.

18. The method defined in claim 17, wherein said lubricant is selected from the group consisting of mineral oils, silicone oils, and lubricant polymers.

19. The method defined in claim 1, wherein the indicia are repeatedly printed in side to side spaced intervals directly on said central core member.

20. The method defined in claim 1, wherein the printer system comprises a laser printing system.

21. A method for mass-producing a plurality of multi-component thermoplastic closures for use in sealing fluid products in a container having a portal forming a neck of the container, said method comprising the steps of:
  A. extruding a continuous, elongated, substantially cylindrically shaped length of material to form a central core member, said central core member comprising a continuous elongated form with a continuous length equivalent to a combined length of the plurality of multi-component thermoplastic closures, and said central core member being devoid of a skin layer or covering layer;
  B. passing the central core member being devoid of a skin layer or covering layer through a printer system that repeatedly prints pre-determined, desired ink-based indicia directly on an outer cylindrical surface of said central core member;
  C. separately extruding a visually transparent, separate and independent layer of plastic material in intimate bonded engagement with the central core member, peripherally surrounding and substantially enveloping the outer cylindrical surface of the central core member and being in overlying relationship with the indicia repeatedly printed on the outer cylindrical surface of said central core member, thereby forming a dual component product; and
  D. repeatedly cutting the dual component product in a plane substantially perpendicular to a central axis of the central core member, thereby forming the plurality of multi-component thermoplastic closures, with each multi-component thermoplastic closure having a desired length for insertion and retention in the portal of the neck of the container, and with each multi-component thermoplastic closure having a core with the desired indicia contained thereon and visible through the separate and independent layer of plastic material,
  wherein said manufacturing process operates as a continuous formation process with all steps being performed in-line, with virtually no manual intervention and with a fully produced final product being achieved.

22. The method defined in claim 21, wherein the printer system comprises a laser printing system.

23. The method defined in claim 21, wherein the indicia are repeatedly printed in side to side spaced intervals directly on said central core member.

* * * * *